United States Patent [19]

Sueda et al.

[11] Patent Number: 4,679,931

[45] Date of Patent: Jul. 14, 1987

[54] ELECTROPHOTOGRAPHIC APPARATUS

[75] Inventors: Tetsuo Sueda, Chofu; Mitsuhiro Tokuhara, Chigasaki; Takeshi Baba, Atsugi, all of Japan

[73] Assignee: Canon Kabushiki Kaisha, Tokyo, Japan

[21] Appl. No.: 907,168

[22] Filed: Sep. 15, 1986

Related U.S. Application Data

[63] Continuation-in-part of Ser. No. 753,523, Jul. 10, 1985, abandoned.

[30] Foreign Application Priority Data

Dec. 7, 1984 [JP] Japan ............................... 59-143296

[51] Int. Cl.[4] ....................... G03B 27/34; G03B 27/40

[52] U.S. Cl. ........................................... 355/56; 355/8

[58] Field of Search .................... 355/8, 11, 52, 56, 57

[56] References Cited

U.S. PATENT DOCUMENTS

| | | | |
|---|---|---|---|
| 3,364,814 | 1/1968 | Iuliu | 355/52 X |
| 4,420,249 | 12/1983 | Trump | 355/52 X |
| 4,426,149 | 1/1984 | Kuemmel et al. | 355/56 X |
| 4,435,070 | 3/1984 | Kitajima | 355/56 X |

*Primary Examiner*—Richard A. Wintercorn

*Attorney, Agent, or Firm*—Fitzpatrick, Cella, Harper & Scinto

[57] ABSTRACT

An electrophotographic apparatus has illuminating means for illuminating an original, scanning means for scanning the original, imaging means for imaging the reflected light or the transmitted light from the original on a light-receiving member, the imaging means having at least one variable refractive power element, control means for varying the refractive power of the variable refractive power element, and driving means for moving the light-receiving member in synchronism with the scanning of the original.

8 Claims, 21 Drawing Figures

FIG. 4A
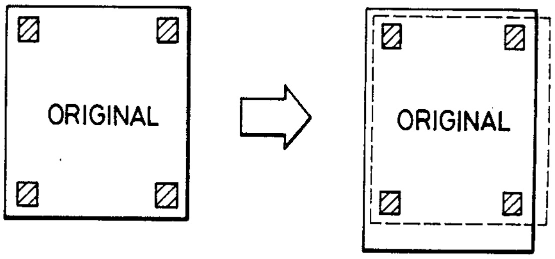
FIG. 4B
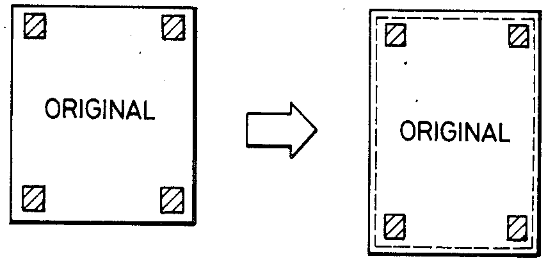
FIG. 5A
FIG. 5B
FIG. 5C
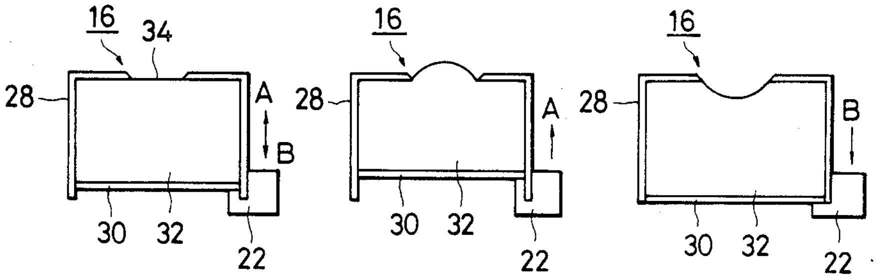
FIG. 5D
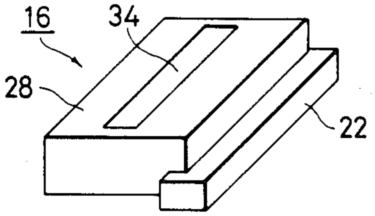

ELECTROPHOTOGRAPHIC APPARATUS

This application is a continuation-in-part of application Ser. No. 753,523 filed July 10, 1985 now abandoned.

BACKGROUND OF THE INVENTION

1. Field of the Invention

This invention relates to an electrophotographic apparatus, and in particular to an electrophotographic apparatus which is capable of changing the copying magnifications in a one-dimensional direction and a two-dimensional direction.

2. Description of the Prior Art

In electrophotographic apparatuses such as copying apparatuses, the imaging lens system for imaging an original on a light-receiving member such as a photosensitive drum has heretofore been comprised of a magnification changing lens system to vary the copying magnification of the original.

FIGS. 1A–1C of the accompanying drawings show a basic two-dimensional direction magnification changing method in the electrophotographic apparatus according to the prior art. In these Figures, reference numeral 1 designates an original which is the object surface, reference numeral 2 denotes a light-receiving member which is the image plane, reference numeral 3 designates an imaging lens system, reference numerals 31, 32, 33 and 34 denote constituent lenses, and reference numeral 4 designates a stop. FIG. 1A shows the case of reduction (when the imaging magnification is $\beta$, $|\beta|<1$), FIG. 1B shows the case of one-to-one magnification, and FIG. 1C shows the case of enlargement.

Usually, the imaging magnification in the apparatus of this type is used about one-to-one magnification and therefore, the imaging lens system 3 has a symmetrical shape with respect to the stop 4 as shown, and the whole of the imaging lens system 3 is moved in the direction of the optic axis thereof to effect a magnification change and the lenses 31 and 34 in the imaging lens system 3 are moved by the same distance in opposite directions, thereby correcting any variation in the position of the image plane resulting from the magnification change.

In an electrophotographic apparatus like the above-described example of the prior art, the lenses 31 and 34 become spaced apart from the stop 4 during a magnification change and therefore, the apertures of the lenses must be made great and wider angles of views of the lenses have hindered compactness of the entire optical system. There is also a method in which the lenses 31 and 34 are fixed and the lenses 32 and 33 are moved, but again in this case, the space for movement of the lenses 32 and 33 becomes necessary and therefore, a problem similar to that described above arises. Also, the individual lenses must be moved with the movement of the entire imaging lens system, and this has led to the complication of the lens barrel and the complication of the driving mechanism, which in turn has led to a problem in terms of cost.

There is also known an apparatus in which, in addition to thus varying the copying magnification in the two-dimensional direction, the copying magnification only in the one-dimensional direction of the original can be varied. The electrophotographic apparatus of this type, as compared with the above-described electrophotographic apparatus in which the size of the image can be two-dimensionally varied, has an advantage that additional information can be printed in a continuous form on the blank space portion of the copy image.

FIGS. 2A–2C of the accompanying drawings illustrates the copy image in a case where the original has been two-dimensionally reduced and the copy image in a case where only one direction of the original has been reduced. In the copy image B wherein the original A has been two-dimensionally reduced, an L-shaped blank space portion is created and therefore, if the same form is adopted when additional information X is printed, a blank is created. However, in the copy image C wherein the original has been reduced only in one direction (the lengthwise direction), a blank space portion is only created in the upper or lower portion of the paper and the additional information X can be printed without the form being altered. The function of changing the magnification only in one direction of an original has an additional advantage that even if characters are reduced in order not to vary the information density in one direction, the characters are easy to read.

FIG. 3 of the accompanying drawings illustrates the structural principle of an electrophotographic apparatus according to the prior art which is capable of varying the magnification only in one direction.

In FIG. 3, reference numeral 5 designates an original carriage, reference numeral 6 denotes an original, reference numeral 7 designates an illuminating optical system, reference numeral 8 denotes a slit, reference numeral 12 designates a photosensitive drum, reference numeral 14 denotes a cylinder lens, arrows indicate the directions of movement of the original carriage 5 and the photosensitive drum 12, and m and M represent the movement velocities of the original carriage 5 and the photosensitive drum 12, respectively. As shown, the original 6 placed on the original carriage 5 is illuminated by the illuminating optical system 7, and the illuminated image passes through the slit 8 and is imaged and recorded on the light-receiving member 12 such as a photosensitive drum by a rotation-symmetrical imaging lens system 3. The movement velocity m of the original carriage 5 and the angular velocity M of the light-receiving member 12 are suitably set in accordance with the imaging magnification.

Where reduction is to be effected with respect to one direction (in FIG. 3, x direction) of the original 6 and imaging and recording at one-to-one magnification is to be effected with respect to y direction, the ratio between the velocity m and the angular velocity M is varied in conformity with the reduction rate. However, if, at this time, the imaging lens system remains at one-to-one magnification, the image recorded on the light-receiving member 12 will be blurred with respect to the x direction and therefore, it s necessary to correct the imaging magnification with respect to the x direction. Thus, in the electrophotographic apparatus according to the prior art, the cylinder lens 14 for correcting the magnification has been inserted just in front of the imaging plane of the light-receiving member 12, and the imaging magnification in the x direction has been made coincident with the reduction rate, thereby correcting the imaging magnification. The cylinder lens 14 has a bus line in a direction perpendicular to the plane of the drawing sheet, and its length corresponds to the length of the light-receiving member 12 in the direction perpendicular to the plane of the drawing sheet. Accordingly, as described above, in the electrophotographic apparatus according to the prior art, the operation of inserting the cylinder lens 14 into the optical path to change the magnification in one direction of the original 6 has been necessary, and this has led to a disadvantage that the length of the optical path between the original 6 and the light-receiving member 12 is greatly fluctuated by inserting the cylinder lens 14 and a clear image cannot be obtained.

Also, to provide a plurality of reduction or enlargement magnifications in one direction of the original, it is necessary to prepare plural types of cylinder lenses, and this has led to a disadvantage that a wide space is required within the apparatus and the mechanical construction of the apparatus becomes complex.

Further, the electrophotographic apparatus according to the prior art has suffered from a disadvantage that the two-dimensional size of the image being copied cannot be freely chosen. For example, in such an electrophotographic apparatus, where reduction or enlargement is to be effected two-dimensionally, it is effected with the imaging lens system 3 as the magnification changing mechanism. Where an original written on paper of U.S. letter size or legal size is to be copied on copying paper of size A or B, the imaging magnification in the y direction of the original is adjusted by the magnification changing mechanism which is the imaging lens system 3 and the imaging magnification in the x direction of the original is adjusted by the feeding velocity m of the original and the angular velocity M of the light-receiving member 12. As a result, where the ratio of the length to the width of the original differs from the ratio of the length to the width of the copying paper, the electrophotographic apparatus according to the prior art has suffered from a disadvantage that as shown in FIG. 4A of the accompanying drawings, unnecessary space is created in the copying paper or a part of the original fails to be recorded. Accordingly, in order to prevent such unnecessary space from being created in the copying paper, it is necessary to make the imaging lens system 3 into a magnification changing optical system and insert the cylinder lens 14, but again in this case, a disadvantage has arisen that the length of the optical path between the imaging lens system 3 and the light-receiving member 12 is varied by the insertion of the cylinder lens 14 and a clear image cannot be obtained.

SUMMARY OF THE INVENTION

It is an object of the present invention to provide, in view of the disadvantages peculiar to the prior art, an electrophotographic apparatus which is capable of controlling the copying magnification of an original as desired by a simple construction.

To achieve the above object, the electrophotographic apparatus according to the present invention is characterized by illuminating means for illuminating an original, scanning means for scanning said original, imaging means having at least one variable refractive power element for imaging the reflected light or the transmitted light from said original on a light-receiving member, control means for varying the refractive power of said variable refractive power element, and driving means for moving said light-receiving member in synchronism with the scanning of said original.

Said scanning means may be one which causes an original carriage on which the original is placed to scan, one which causes the illuminating means to scan with the original carriage remaining fixed, or one which illuminates and scans the original by causing a mirror to scan with a light source remaining fixed.

As the variable refractive power element, mention may be made of various elements utilizing the electro-optical effect, the magneto-optical effect, the thermo-optical effect or the like, such as a liquid crystal lens and a double-refractive lens, and an element utilizing the deformation of a transparent elastic member. Particularly, this element utilizing the transparent elastic material has no polarizing characteristic and is therefore very useful for such kind of apparatus. Also, these variable refractive power elements may assume various forms in conformity with their usages, whereby they can have the function of varying the refractive power in a one-dimensional direction or a two-dimensional direction.

Said variable refractive power element functions as an optical path length correcting means for correcting variation in the position of the image plane caused when the copying magnification is varied by moving at least a part of said imaging means in the direction of the optic axis, and also functions as a magnification changing means for varying the refractive power of the element itself and changing the copying magnification. Accordingly, by applying an element of this type, the construction of the apparatus is made simple and compact, and requires a smaller number of mechanical driving portions because of the ability to accomplish electrical control. Further, the refractive power of said variable refractive power element is continuously varied in accordance with a control signal and therefore, any continuous copying magnification can be set.

BRIEF DESCRIPTION OF THE DRAWINGS

FIGS. 4A and B show the results of the one-direction magnification change in the prior art and the present invention, respectively.

FIGS. 5A–5D show an example of the variable refractive power element which is applicable to the present invention and which utilizes a transparent elastic member and can control the refractive power in a one-dimensional direction.

DESCRIPTION OF THE PREFERRED EMBODIMENTS

Figure 1A:
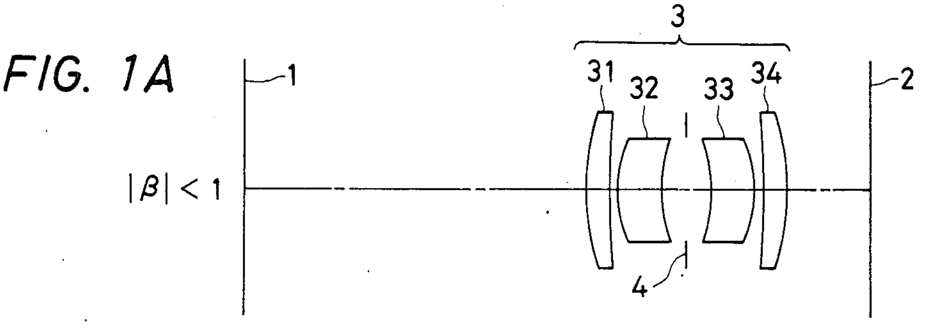
FIGS. 1A–1C show an example of the magnification changing method in an electrophotographic apparatus according to the prior art.
Figure 1B:
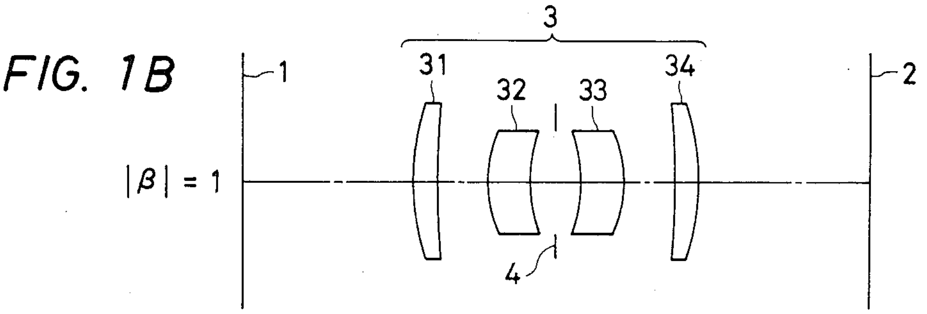
Figure 1C:
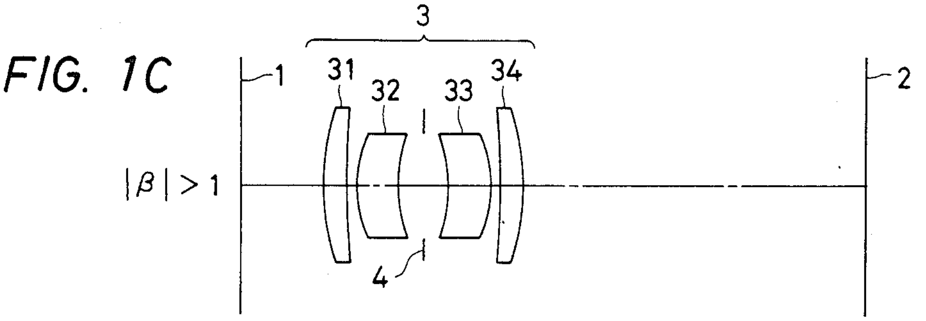

FIG. 5 shows an example of the construction of a variable refractive power element, FIGS. 5A–5C being cross-sectional views and FIG. 5D being a perspective view. In FIG. 5, reference numeral 16 designates a variable refractive power element body, reference numeral 22 denotes an actuator, reference numeral 28 designates a casing, reference numeral 30 denotes a transparent glass plate, and reference numeral 32 designates a transparent elastic member. As shown, in the variable refractive power element body 16, the transparent glass plate 30 is provided for sliding movement in directions A and B relative to the casing 28, and the transparent elastic member 32 such as transparent silicon rubber is loaded between the casing 28 and the transparent glass plate 30. An opening 34 is formed in the upper surface of the casing 28, and light is transmitted through the opening 34, the transparent elastic member 32 and the transparent glass plate 30. The actuator 22 is mounted on the exterior of the casing 28 and the transparent glass plate 30 is slid in directions A and B by the actuator 22. When the transparent glass plate 30 is moved in the direction A, the transparent elastic member 32 swells convexly through the opening 34 as shown in FIG. 5B and therefore serves as a convex cylinder lens. Conversely, when the transparent glass plate 32 is moved in the direction B, the transparent elastic member 32 caves in concavely at the opening 34 as shown in FIG. 5C and therefore serves as a concave cylinder lens. Thus, a cylinder lens can be formed by deforming the transparent elastic member 32, and it is possible to control the shape of the lens and change the refractive power in a one-dimensional direction.

Figure 6:
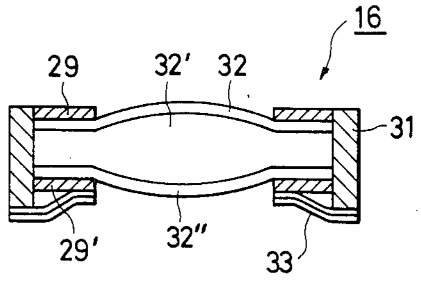
FIG. 6 shows another example of the variable refractive power element which is applicable to the present invention and which utilizes a transparent elastic member and can control the refractive power in a two-dimensional direction.

FIG. 6 shows another example of the construction of the variable refractive power element applicable to the present invention. This element is capable of changing the refractive power in two-dimensional direction. In FIG. 6, reference numerals 32, 32′ and 32″ designate transparent elastic members, reference numerals 29 and 29′ denote opening plates each having a circular opening, reference numeral 31 designates a cylindrical container, and reference numeral 33 denotes a piezo-electric material bimorph element comprising two sheets of piezo-electric material. The modulus of elasticity of the transparent elastic members 32 and 32″ is greater than the modulus of elasticity of the transparent elastic member 32′. The opening plates 29 and 29′ are provided in such a manner as to vertically sandwich the transparent elastic members 32, 32′ and 32″ therebetween, the opening plate 29 is fixed to the cylindrical container 31, and the opening plate 29′ is movable along the inner wall of the cylindrical container 31 and is in intimate contact with the piezo-electric material bimorph element 33. The piezo-electric material bimorph element 33 is elastically deformed in response to a voltage applied thereto and vertically moves the opening plate 29′ which is in intimate contact therewith. With the movement of the opening plate 29′, the transparent elastic members 32, 32′ and 32″ are pressure-deformed and the curvatures of the surfaces of the transparent elastic members 32 and 32″ are varied and the refractive power of the variable refractive power element 16 is also varied. As a matter of course, the amount of variation in the refractive power is controllable by changing the voltage applied to the piezo-electric material bimorph element 33. The opening plates 29 and 29′ can be used also as the stops in the optical system.

Examples of the material of the transparent elastic members 32, 32′ and 32″ will be mentioned below.

In dependent polymers of diene compounds such as natural rubber, polybutadiene, polyisoprene, polychloroprene and polynorboluadiene, and rubber substances such as diene copolymers obtained by copolymerizing butadiene-styrene, isoprene-isoptene, butadiene-acrylonitrile, butadiene-acrylic acid or diene monomers such as esters thereof with one or more vinyl monomers.

High molecules obtained by copolymerizing α-olefine such as propylene with ethylene and copolymerized with a small amount of diene compound. Polyethylene copolymer obtained by copolymerizing a large amount of polar vinyl monomer with ethylene and having the crystalline property of polyethylene remarkably reduced or exhausted, other polysilokins than hydrocarbon, so-called silicon rubber and polyphosphazene.

High molecular molten materials obtained by liquifying thermoplastic resin at a temperature higher than the melting point thereof, such as, for example, polyolefine, polyamide, polyamide polystyrene, ester of polyacrylic acid, polyvinyl chloride and polyvinyl oxide. The above-mentioned high molecular compounds need not always be independent polymers, but may be polymers obtained by copolymerizing other one or more monomers than the main constituent monomer. Further, the elastic force of the above-mentioned high molecules can be adjusted by bridging them by a chemical technique using a compound peroxide, sulfur or the like or a physical technique using alight or radiation. Also, the thermoplastic resin can be subjected to the bridging reaction by copolymerizing monomers having functional groups capable of effecting the bridging reaction in advance and using a chemical technique or a physical technique.

A high molecular solution obtained by dissolving a high molecular compound to higher than a concentration at which certain kinds of high molecules are not molecule-dispersed, so-called high molecular gel comprising bridged high molecules impregnated with a suitable solevent, for example, ester of acrylic acid, or acrylic gel constituted by this ester of acrylic acid or the like and swollen by water.

An electrophotographic apparatus using the above-described variable refractive power element will hereinafter be described in detail.

Figure 3:
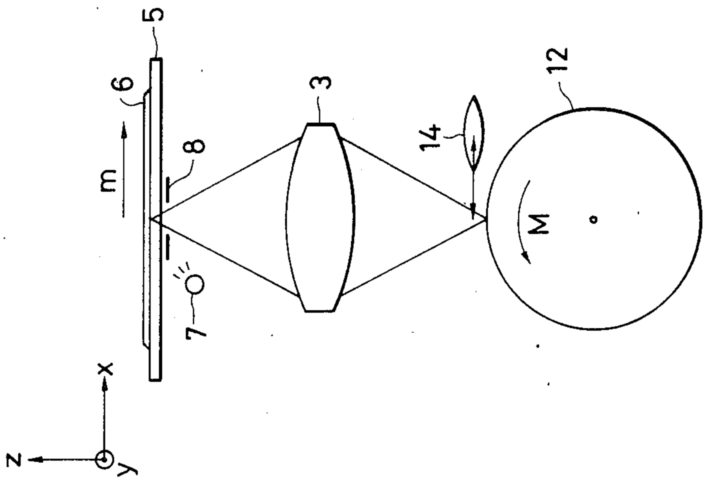
FIG. 3 shows an example of the construction of the conventional electrophotographic apparatus having the one-direction magnification changing function.
Figure 2A:
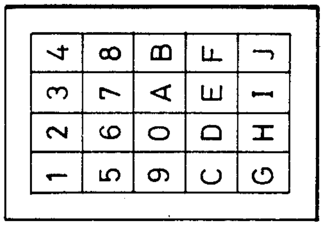
FIGS. 2A–2C shows the effect when the copying magnification only in one direction of an original has been changed.
Figure 2C:
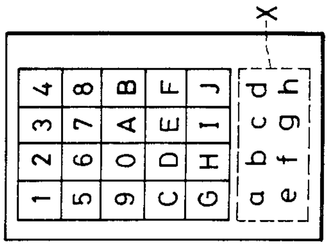
Figure 2B:
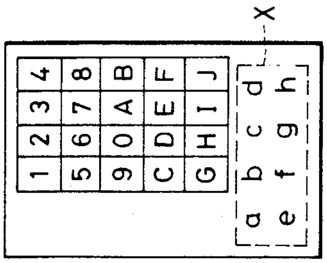
Figure 7:
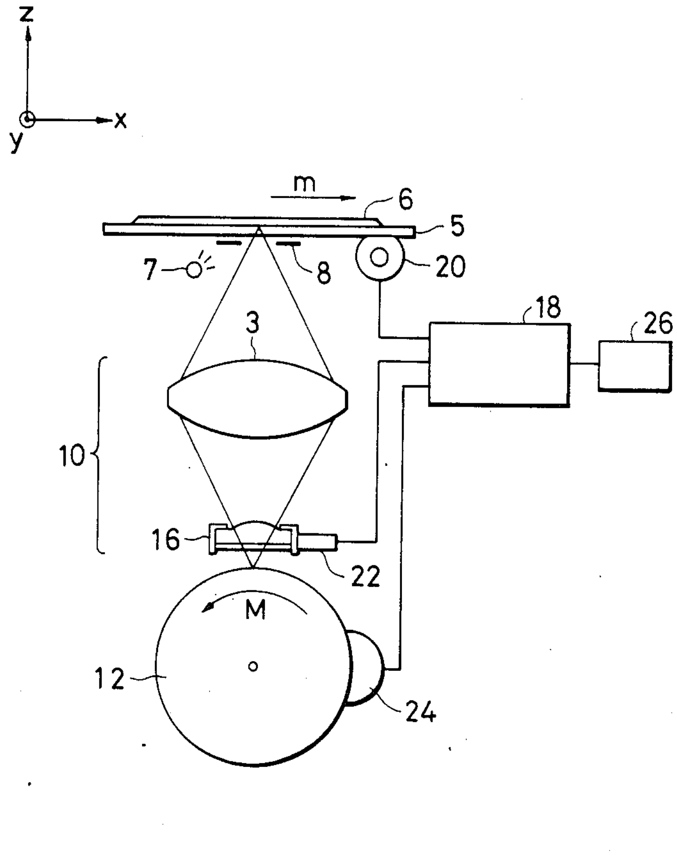
FIG. 7 shows an example of the construction of an electrophotographic apparatus according to the present invention which has the one-direction magnification changing function.

FIG. 7 shows an example of the construction of the electrophotographic apparatus according to the present invention. This apparatus has the one-direction magnification changing function. In FIG. 7, reference numeral 10 designates imaging means, reference numeral 18 denote control means, reference numeral 20 designates an actuator for driving an original carriage 5 in x direction, reference numeral 24 denotes an actuator for driving a photosensitive drum 12, reference numeral 26 designates an input device for inputting an x-direction copying magnification, and the other reference numerals denote members similar to those shown in FIGS. 3 and 6.

In the present electrophotographic apparatus, the variable refractive power element 16 is provided between the imaging lens system 3 and the light-receiving member 12 to thereby constitute the imaging means 10, and the control means 18 for controlling the refractive power of the variable refractive power element 16 is provided.

Operation will now be described. In FIG. 7, when the x-direction imaging magnification of an original 6 is input to the input device 26, the control means 18 operates the actuator 22 for varying the power of the variable refractive power element 16 and varies the x-direction imaging magnification.

After the magnification of the variable refractive power element 16 as described above has been set, the electrophotographic process is started and the image of the original is copied. At this time, the movement velocities of the actuator 20 and the actuator 24 are controlled by the control means 18 so that the ratio between the amount of movement of the original 6 in m direction (x direction) and the amount of rotation of the light-receiving member 12 in M direction becomes equal to the imaging magnification.

Thus, by the light from the illuminating optical system 7, an image of the original 6 reduced or enlarged only in one direction is provided on the light-receiving member 12.

Also, in the present embodiment, if the imaging lens system 3 is a magnification changing optical system, the two-dimensional size of the image being copied can be chosen freely. That is, as shown in FIG. 4B, it is also possible to effectively copy the information of the original without creating any unnecessary space.

Also, one-dimensional and two-dimensional magnification changes can be accomplished at a time and therefore, there are provided many variations of copy (reduction and enlargement).

Figure 8:
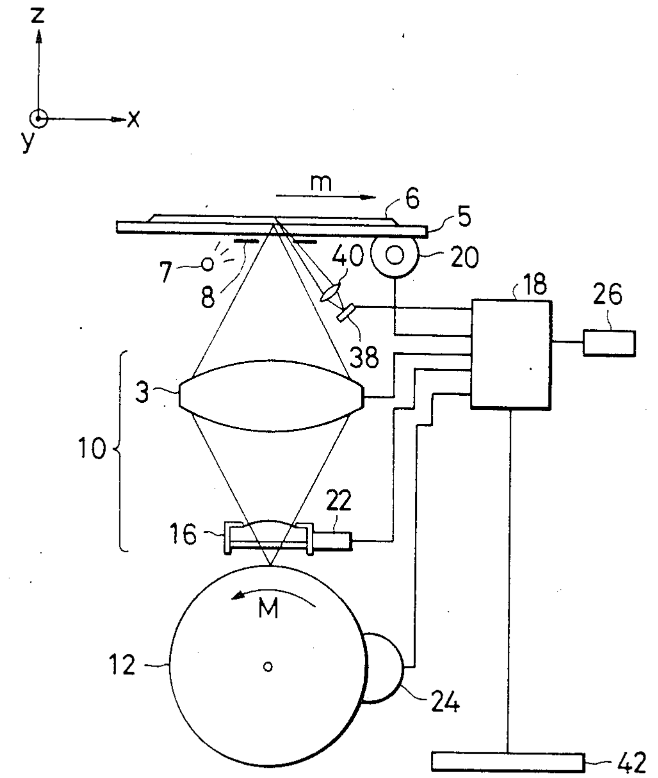
FIG. 8 shows another example of the construction of the electrophotographic apparatus according to the present invention which has the one-direction magnification changing function.

FIG. 8 shows another example of the construction of the electrophotographic apparatus according to the present invention. This electrophotographic apparatus is characterized by the provision of original detecting means for detecting the size of the original, copying paper detecting means for detecting the size of copying paper, and control means for controlling the magnification of the variable refractive power element 16 in accordance with the size of the original and the size of the copying paper.

That is, in FIG. 8, reference numeral 38 designates a photodiode array sensor (hereinafter referred to as the first sensor) which is the original detecting means having a bit in a direction perpendicular to the plane of the original. The size of the original is detected by the first sensor 38. Reference numeral 40 denotes an imaging lens for forming the image of the original on the first sensor 38. Reference numeral 42 designates a second sensor which is the copying paper detecting means for detecting the size of the copying paper. Members similar to those in the previously described embodiment are given similar reference numerals. The outputs of the first and second sensors 38 and 42 are input to the control means 18, which serves to recognize the size of the original and the size of the copying paper, determine the imaging magnifications and control each of the imaging magnifications.

The first sensor 38 is not limited to a photodiode array sensor, but may also be a photodiode which detects the quantity of reflected light from the original, or one which detects the size of the original by the ratio between the quantities of reflected light entering a plurality of sensors. Further, the second sensor 42 for detecting the size of the copying paper may have the mechanical or optical discriminating function of discriminating the size of the case containing the copying paper therein or discriminating the size of the copying paper.

Operation will now be described. Before the copying process is carried out, the original 6 is once moved in x direction and the size of the original 6 is detected by the use of the first sensor 38. The size of the copying paper is detected by the second sensor 42, and the size of the original and the size of the copying paper are input to the control means 18, by which the x-direction and y-direction imaging magnifications are determined in accordance with the size of the original and the size of the copying paper and thus, the electrophotographic process is carried out.

According to the present electrophotographic apparatus, the first sensor 38 for detecting the size of the original 6 is installed within the electrophotographic apparatus and the size of the original 6 is recognized thereby, and the x-direction imaging magnification by the imaging lens system 3 and the variable refractive power element 16 is controlled in accordance with the designated copying paper and therefore, designation or the like of the imaging magnification is automatically effected in the electrophotographic apparatus and need not be effected by the operator.

While the above-described embodiments are concerned with the electrophotographic apparatus of the movable original carriage type in which the original carriage 5 is moved in x direction relative to the other members, the present invention is also effective in an electrophotographic apparatus of the so-called fixed original carriage type in which the illuminating optical system 7 and the slit 8 are moved relative to the other members and with the movement thereof, a reflecting mirror or the like for correcting the length of the optical path between the original carriage 5 and the imaging lens system 3 is moved.

As described above in detail and specifically, according to the present invention, in an electrophotographic apparatus, a variable refractive power element is used in the imaging means to vary the imaging magnification in one direction of the original, whereby any imaging magnification can be obtained, and by such element being used with a variable magnification imaging lens system, the imaging magnifications in the lengthwise and widthwise directions of the original can be chosen freely and thus, it is possible to accomplish clear copying without reducing the amount of image information.

Figure 9:
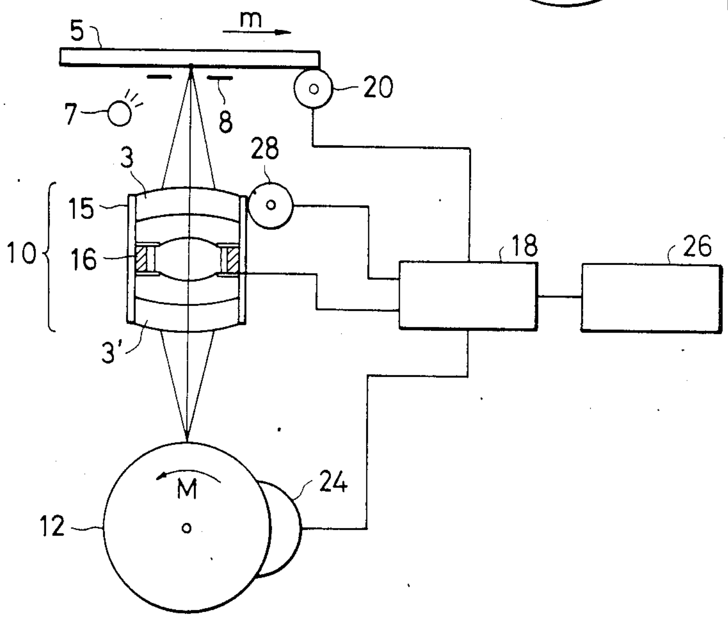
FIG. 9 shows still another example of the construction of the electrophotographic apparatus according to the present invention for changing the copying magnification in a two-dimensional direction.

FIG. 9 shows still another example of the construction of the electrophotographic apparatus according to the present invention. This apparatus is capable of controlling the copying magnification in a secondary direction. Members similar to those in the previously described embodiment are given similar reference numerals. Reference numerals 3 and 3' designate imaging lens systems, and reference numeral 15 denotes a lens barrel.

A predetermined copying magnification is input by the input device 20 and in accordance therewith, the control device 18 causes the following operation to be executed. An actuator 28 is first controlled to vary the magnification of the imaging means 10 and the imaging means 10 is moved to a predetermined position in the direction of the optic axis thereof. Subsequently, in accordance with pre-stored information (the relation between the copying magnification and the applied voltage), a voltage is applied to the piezo-electric material bimorph element or the like shown in FIG. 6, the refractive power of the variable refractive power element 16 is varied and correction of the length of the optical path is effected so that the image plane of the imaging means 10 lies on the photosensitive drum 12. Subsequently, the actuator 20 and the actuator 24 are controlled so that the ratio between the movement velocity (m) of the original carriage 5 and the peripheral velocity (M) of the photosensitive drum 12 becomes equal to the magnification change ratio, and the original carriage 5 and the photosensitive drum 12 are driven to start the electrophotographic process.

Figure 10A:
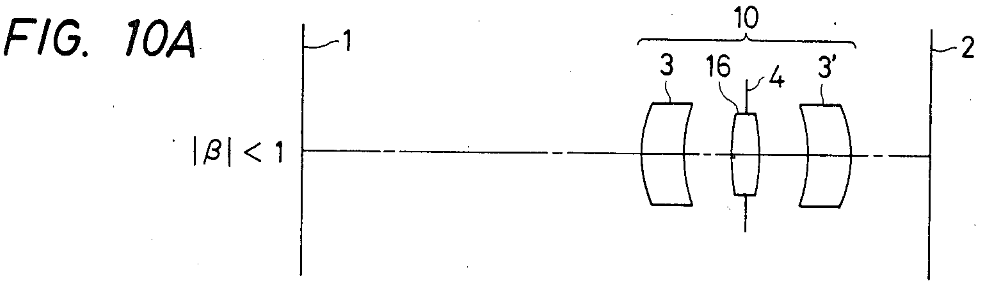
FIGS. 10A–10C is a schematic view illustrating the magnification changing method in the apparatus shown in FIG. 9.
Figure 10B:
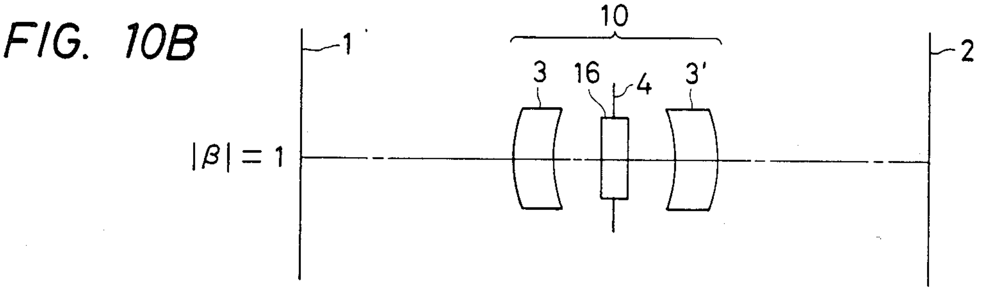
Figure 10C:
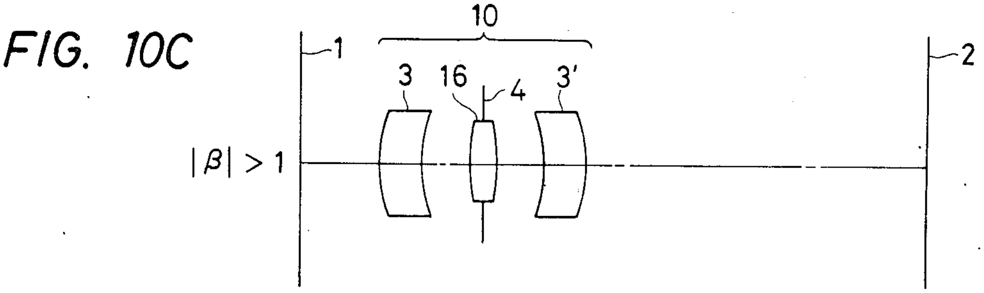

FIGS. 10A-10C show schematic views of the magnification changing mechanism in the present electrophotographic apparatus. As previously described, the variable refractive power element 16 itself serves also as the stop 4, and during a magnification change, the entire imaging means 10 is moved, but the relative position of the lens system 3 and 3' and the stop 4 does not vary and it is not necessary to move the individual lenses in order to correct the position of the image plane and therefore, compactness can generally be achieved and the driving mechanism also becomes simple.

Figure 11:
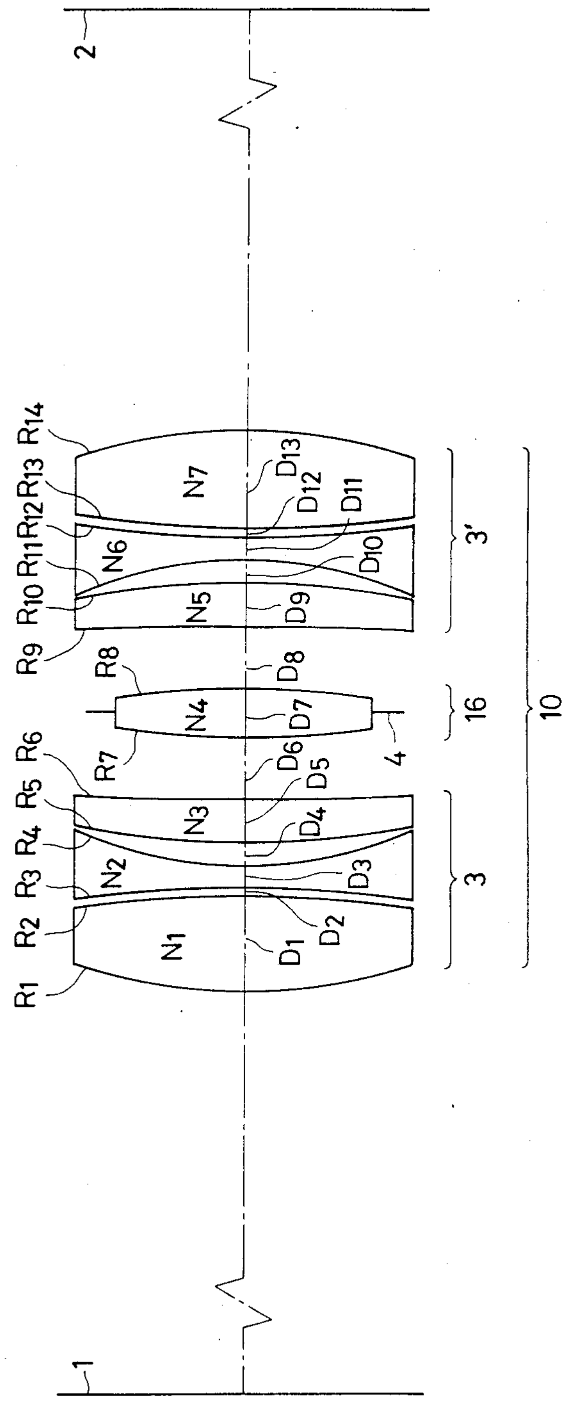
FIG. 11 is a cross-sectional view showing an example of the imaging means of the electrophotographic apparatus according to the present invention.

Examples of the numerical values of the imaging means in the present electrophotographic apparatus are shown in the table blow, and a cross-sectional view of the imaging means is shown in FIG. 11.

In the table below, Ri (i=1, 2, 3, . . . ) represents the radius of curvature of the ith surface as counted from the object surface (original) 1 side, Di (i=1, 2, 3, . . . ) represents the on-axis air space or the on-axis thickness between the ith surface and the (i+1)th surface as counted from the object surface 1 side, and Ni (i=1, 2, 3, . . . ) represents the refractive index of the ith lens as counted from the object surface 1 side.

The variable refractive power element 16 is positioned between the imaging lens systems 3 and 3' disposed about the stop 4, and the curvatures R7 and R8 of both surfaces thereof vary by a minute amount in accordance with the variation in the imaging magnification as shown in the table below.

| Radius of Curvature | On-Axis Air Space or On-Axis Thickness | Refractive Index |
|---|---|---|
| R1 = 64.50 | D1 = 12.00 | |
| | | N1 = 1.70 |
| R2 = −135.18 | D2 = 1.06 | |
| R3 = −124.69 | D3 = 2.70 | |
| | | N2 = 1.64 |
| R4 = 46.33 | D4 = 3.18 | |
| R5 = 108.79 | D5 = 5.50 | |
| | | N3 = 1.72 |
| R6 = 652.03 | D6 = 8.10 | |
| R7 = variable | D7 = 6.00 | |
| | | N4 = 1.45 |
| R8 = variable | D8 = 8.10 | |
| R9 = −652.03 | D9 = 5.50 | |
| | | N5 = 1.72 |
| R10 = −108.79 | D10 = 3.18 | |
| R11 = −46.33 | D11 = 2.70 | |
| | | N6 = 1.64 |
| R12 = 124.69 | D12 = 1.06 | |
| R13 = 135.18 | D13 = 12.00 | |
| | | N7 = 1.70 |
| R14 = −64.50 | | |

| Imaging Magnification | Focal Length of Entire System | R7 | R8 | Distance Between Object Surface 1 and Surface R1 |
|---|---|---|---|---|
| −0.625 | 80.63 | 100.50 | −100.50 | 176.72 |
| 1.0 | 85.16 | 112.40 | −112.40 | 137.48 |
| 1.60 | 80.63 | 100.50 | −100.50 | 198.22 |

Distance between object surface 1 and image plane 2: 346.04

While the above-described embodiment shows an electrophotographic apparatus of the movable original carriage type, it is apparent that the present invention is also applicable to an electrophotographic apparatus of the fixed original carriage type. In the case of the fixed original carriage type, the light source or the mirror and the first reflecting mirror are usually moved to effect copying and therefore, the imaging optical system has several mirrors. Accordingly, it is also possible to mount a mirror, for example, on one side of the variable refractive power element, dispose it at any position and correct the length of the optical path in accordance with the copying magnification, or the mirror may be disposed and used in the optical path near the photosensitive drum which is the light-receiving member.

As previously described, the variable refractive power element is not limited to one using a transparent elastic material, but may be one of various elements utilizing liquid crystal, electrooptical crystal or the like. Further, of course, the construction of the imaging means may take various forms in conformity with the specification or the like of the apparatus.

As described above, if correction of the position of the image plane, i.e., correction of the length of the optical path, is effected by the variable refractive power element, the construction of the apparatus will become simple and compact. It is also possible to construct a magnification changing lens system for effecting magnification change by the use of the variable refractive power element, as previously mentioned. For example, where two-dimensional magnification change is to be effected, a plurality of said variable refractive power elements are used and a lens system provided with at least one variable refractive power element symmetrical with respect to the stop as shown in FIG. 11 is disposed, and by varying the refractive powers of the individual variable refractive power elements, the focal length of the entire system is varied to thereby accomplish magnification change. Also, a variable refractive power element is used for correction of the position of the image plane, i.e., correction of the length of the optical path, as in the above-described embodiment. Accordingly, in this case, it becomes unnecessary to move the imaging means and any other driving means than the control system of the variable refractive power element is absent. Thus, the full length of the imaging means can be shortened and the space necessary for movement of the imaging means need not be taken into consideration, and this leads to the possibility of making the entire apparatus compact.

There is also a method of controlling the refractive power of the variable refractive power element to thereby vary the imaging magnification and effect the correction of the position of the image plane by movement of at least a part of the imaging means. In this case, the amount of movement of the imaging means may be smaller than the amount of movement as has heretofore been required for magnification change and accordingly, the space for movement may be narrow. Thus, the driving energy may be small and compactness of the apparatus can be achieved.

It is apparent that the method of changing the copying magnification by a variation in the refractive power of the variable refractive power element itself as described above is also applicable to both of the movable original carriage type and the fixed original carriage type.

What we claim is:

1. An electrophotographic apparatus having:

illuminating means for illuminating an original;

scanning means for scanning the original;

imaging means for imaging the reflected light or the transmitted light from the original on a light-receiving member, said imaging means having at least one variable refractive power element the refractive power of which is varied by varying at least one of the refractive index and the shape thereof;

control means for varying at least one of the refractive index and shape of said variable refractive power element; and driving means for moving said light-receiving member in synchronism with the scanning of the original.

2. An electrophotographic apparatus having:

illuminating means for illuminating an original;

scanning means for scanning the original;

imaging means for imaging the reflected light or the transmitted light from said original on a light-receiving member, at least a part of said imaging means being movable in the direction of the optical axis of said imaging means, said imaging means having at least one variable refractive power element the refractive power of which is varied by varying at least one of the refractive index and the shape thereof;

control means for varying at least one of the refractive index and shape of said variable refractive power element; and driving means for moving said light-receiving member in synchronism with the scanning of the original.

3. An electrophotographic apparatus according to claim 2, wherein the whole of said imaging means is moved in the direction of the optic axis thereof to effect a magnification change, and the refractive power of said variable refractive power element is controlled to correct variation in the position of the image plane resulting from said magnification change.

4. An electrophotographic apparatus according to claim 2, wherein said part of said imaging means is moved in the direction of the optic axis thereof to effect a magnification change, and the refractive power of said variable refractive power element is controlled to correct variation in the position of the image plane resulting from said magnification change.

5. An electrophotographic apparatus according to claim 2, wherein said variable refractive power element has:

a plurality of transparent elastic members layered in the direction of the optic axis;

a pair of support plates provided so as to sandwich said transparent elastic members therebetween, at least one of said support plates having an opening, the surfaces of said support plates being substantially perpendicular to the optic axis; and an actuator for deforming said transparent elastic members in accordance with a control signal.

6. An electrophotographic apparatus having:

illuminating means for illuminating an original;

scanning means for scanning the original;

imaging means for imaging the reflected light or the transmitted light from the original on a light-receiving member, at least a part of said imaging means being movable in the direction of the optical axis of said imaging means;

a variable refractive power element positioned at that side of said imaging means which is most adjacent to said light-receiving member, said element being capable of varying at least one of its refractive index and shape so as to vary its refractive power in a one-dimensional direction; and driving means for moving said light-receiving member in synchronism with the scanning of the original.

7. An electrophotographic apparatus having:

illuminating means for illuminating an original;

scanning means for scanning the original;

imaging means for imaging the reflected light or the transmitted light from the original on a light-receiving member, said imaging means being movable in the direction of the optic axis thereof and having a set of lens groups symnetrical about a stop;

a variable refractive power element disposed near said stop, said variable refractive power element correcting variation in the position of the image plane during a magnification change; and driving means for moving said light-receiving member in synchronism with the scanning of the original.

8. An electrophotographic apparatus having:

illuminating means for illuminating an original;

scanning means for scanning the original;

imaging means for imaging the reflected light or the transmited light from the original on a light-receiving member, said imaging means having at least one variable refractive power element;

original discriminating means for discriminating the size of the original;

copying paper discriminating means for discriminating the size of copying paper on which the original is copied;

control means for controlling the refractive power of said variable refractive power element on the basis of information obtained from said original discriminating means and said copying paper discriminating means; and driving means for moving said light-receiving member in synchronism with the scanning of the original.

* * * * *

UNITED STATES PATENT AND TRADEMARK OFFICE

CERTIFICATE OF CORRECTION

PATENT NO. : 4,679,931

DATED : July 14, 1987

INVENTOR(S) : TETSUO SUEDA, ET AL.

It is certified that error appears in the above-identified patent and that said Letters Patent is hereby corrected as shown below:

ON THE TITLE PAGE, ITEM [30]

The foreign priority data should read as follows:
--July 12, 1984 [JP] Japan ..... 59-143296
June 21, 1985 [JP] Japan ..... 60-136708--

COLUMN 2

Line 54, "s" should read --is--.

COLUMN 6

Line 38, "alight" should read --a light--.
Line 61, "denote" should read --denotes--.

COLUMN 9

Line 21, "system" should read --systems--.

UNITED STATES PATENT AND TRADEMARK OFFICE
CERTIFICATE OF CORRECTION

PATENT NO. : 4,679,931

DATED : July 14, 1987

INVENTOR(S) : TETSUO SUEDA, ET AL.

It is certified that error appears in the above-identified patent and that said Letters Patent is hereby corrected as shown below:

COLUMN 12

Line 34, "symnetrical" should read --symmetrical--.
Line 47, "transmited" should read --transmitted--.

Signed and Sealed this

Twenty-fourth Day of May, 1988

*Attest:*

DONALD J. QUIGG

*Attesting Officer*

*Commissioner of Patents and Trademarks*